(No Model.)
T. HUGHES.
CUTTER.
No. 467,414.
Patented Jan. 19, 1892.
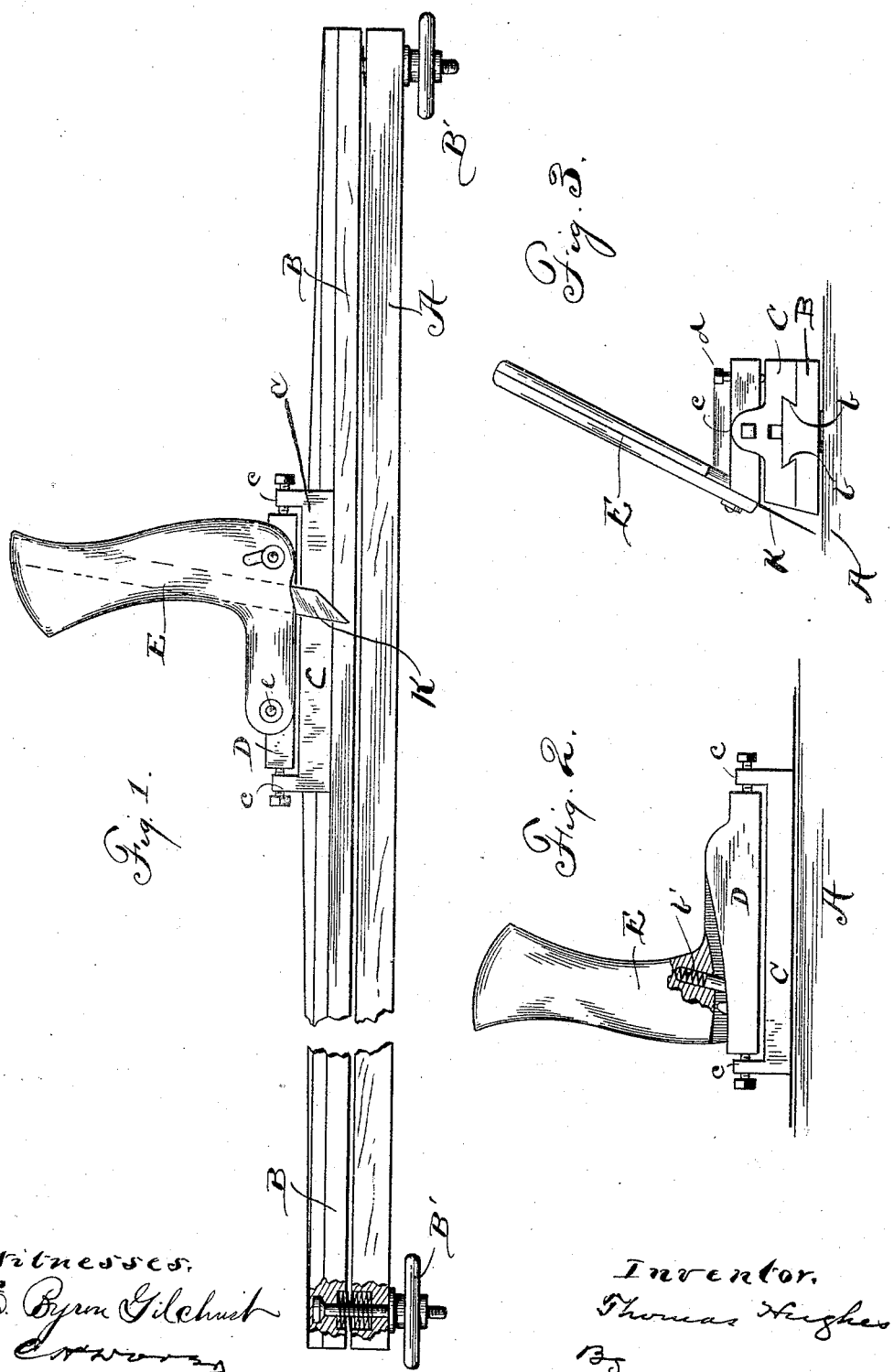

UNITED STATES PATENT OFFICE.

THOMAS HUGHES, OF CLEVELAND, OHIO.

CUTTER.

SPECIFICATION forming part of Letters Patent No. 467,414, dated January 19, 1892.

Application filed May 4, 1891. Serial No. 391,528. (No model.)

*To all whom it may concern:*

Be it known that I, THOMAS HUGHES, of Cleveland, in the county of Cuyahoga and State of Ohio, have invented certain new and useful Improvements in Cutters; and I do hereby declare the following to be a full, clear, and exact description of the invention, such as will enable others skilled in the art to which it pertains to make and use the same.

My invention relates to improvements in a cutter designed more especially for cutting or trimming mats for picture-frames, although well adapted to various other purposes; and it consists in certain features of construction and in combination of parts hereinafter described, and pointed out in the claims.

In the accompanying drawings, Figure 1 is a side elevation of a cutting apparatus embodying my invention. Fig. 2 is a side elevation in detail, showing more especially the spring for elevating the knife on the back-stroke. Fig. 3 is an end elevation.

A represents, for instance, a table or piece of plank on which the cutting is done, known as the "cutting-board."

B is a clamping-bar for clamping the mat or material onto the cutting-board, there being provided adjustable clamping-screws B' B' for the purpose. Member B has undercut edges $b\ b$, that are engaged by slide C, forming a dovetail, member B serving as a way on which the slide reciprocates. Slide C has ears $c\ c$, to which is pivoted plate D, so that the latter may tilt laterally a limited distance to change the alignment of the knife K, there being provided one or more adjusting-screws $d$, by manipulating which the knife may be set vertical, so as to cut the material square-edged, or plate D may be tilted in the one direction or the other, so as to cut beveled edges on the mat.

E is a handle of the bell-crank-lever variety, pivoted at the toe thereof at $e$ to member D. This handle is also the knife-holder, having attached the knife K.

The operator is supposed to be at the right hand, relative to Fig. 1, and by means of the handle to draw the slide toward him in cutting. The mats used for picture-frames are likely to be thick and quite dense, being constructed usually of pulp, and if one cut is not sufficient to sever the material a second or third cut may be taken, and of course with the construction shown the knife will always follow in the same path, no matter how many cuts may be necessary. In Fig. 2 a spring $b'$ is shown for elevating the heel of the handle on the back-stroke and thereby elevating the knife so as to clear the work. This spring is of course compressed by the draft on the handle in operating the device in cutting. The operator in pushing on the handle for the return stroke would likely raise the handle and thereby disengage the knife from the work; but without the spring there would be nothing to steady or guide the hand in so doing, while with the spring the recoil thereof is supposed to elevate the knife just far enough to clear the work and the operator can feel the action of the spring, and consequently knows when the handle has been tilted far enough for the purpose.

I do not limit myself to the dovetail union $b$, as any effective union may be substituted therefor and be its full equivalent; nor do I limit my invention to the independently and separably adjustable screws $b'\ b'$, as these may be united together by a shaft connecting them, upon which shaft screw, miter, or other gearing may be made to operate both screws B' B' simultaneously by turning said shaft. This is too obvious a construction to require illustration or detailed description.

What I claim is—

In cutting apparatus, a clamping-bar and a slide operative thereon, a tilting plate mounted on the slide, and a handle of the bell-crank variety pivoted at the toe thereof to such tilting plate, such handle at the heel bearing a knife, substantially as set forth.

In testimony whereof I sign this specification, in the presence of two witnesses, this 25th day of March, 1891.

THOMAS HUGHES.

Witnesses:
 C. H. DORER,
 WARD HOOVER.